United States Patent [19]

Domesle et al.

[11] Patent Number: 5,496,788
[45] Date of Patent: Mar. 5, 1996

[54] COATING DISPERSION FOR EXHAUST GAS CATALYSTS

[75] Inventors: Rainer Domesle, Alzenau; Bernd Engler, Hanau; Edgar Koberstein, Alzenau; Egbert Lox, Hanau; Klaus Ostgathe, Hattersheim, all of Germany

[73] Assignee: Degussa Aktiengesellschaft, Germany

[21] Appl. No.: 17,058

[22] Filed: Feb. 12, 1993

[30] Foreign Application Priority Data

Feb. 14, 1992 [DE] Germany .................. 42 04 421.9

[51] Int. Cl.⁶ .............................. B01J 21/04; B01J 23/40
[52] U.S. Cl. ....................... 502/333; 502/304; 502/334; 502/341; 502/351; 502/355; 502/439; 423/213.5
[58] Field of Search ................................ 502/304, 333, 502/334, 341, 351, 315, 439; 423/213.5

[56] References Cited

U.S. PATENT DOCUMENTS

| | | | |
|---|---|---|---|
| 4,868,149 | 9/1989 | Bricker | 423/213.5 X |
| 5,039,647 | 8/1991 | Iara et al. | 502/251 |
| 5,166,118 | 11/1992 | Kretschmar et al. | 208/112 |
| 5,179,060 | 1/1993 | Subramanian et al. | 502/332 |

FOREIGN PATENT DOCUMENTS

| | | |
|---|---|---|
| 0073703 | 3/1983 | European Pat. Off. . |
| 0119715 | 9/1984 | European Pat. Off. . |
| 0152052 | 8/1985 | European Pat. Off. . |
| 0179578 | 4/1986 | European Pat. Off. . |
| 0211233 | 2/1987 | European Pat. Off. . |
| 0500154 | 8/1992 | European Pat. Off. . |
| 75744 | 4/1988 | Finland . |
| 896294 | 12/1989 | Finland . |
| 2304351 | 8/1974 | Germany . |
| 2538706 | 3/1977 | Germany . |
| 2942728 | 5/1981 | Germany . |
| 3146004 | 5/1983 | Germany . |
| 3835184 | 5/1989 | Germany . |
| 3908320 | 10/1989 | Germany . |
| 3939921 | 12/1989 | Germany . |
| 3830318 | 3/1990 | Germany . |
| 3839580 | 7/1990 | Germany . |
| WO91/08827 | 6/1991 | WIPO . |

*Primary Examiner*—Anthony McFarlane
*Attorney, Agent, or Firm*—Beveridge, DeGrandi, Weilacher & Young

[57] ABSTRACT

A coating dispersion is shown for the production of catalysis-promoting coatings on an inert, structure-reinforcing element. The solids of the dispersion are present in various particle fractions and lead to a relatively rough coating surface with improved exchange between the exhaust gas and the catalyst surface. This results in improved heat-up behavior of the catalyst.

29 Claims, 7 Drawing Sheets

COATING DISPERSION FOR EXHAUST GAS CATALYSTS

BACKGROUND OF THE INVENTION

This invention relates to a coating dispersion for the production of a support layer for catalytically active components on exhaust gas catalysts. The catalysts include an inert structure-reinforcing element with the coating dispersion coated thereon. The invention also relates to a process for the production of the dispersion and to a monolithic catalyst coated with the dispersion. The coating dispersion includes an aqueous dispersion of one or more temperature-resistant support materials as solids and, optionally, one or more other solids and/or one or more dissolved compounds as promoters and/or active components.

The pollutants in exhaust gases, particularly in the exhaust gases of internal combustion engines of motor vehicles, are a health hazard to human beings, animals and plant life. Accordingly, the pollutants have to be converted as completely as possible into harmless compounds by treatment of the exhaust gases. The pollutants are, in particular, unburnt hydrocarbons, carbon monoxide and oxides of nitrogen.

Exhaust gases have been successfully treated with multifunctional catalysts. Provided that the combustion process is suitably controlled, these multifunctional catalysts are capable of converting a high percentage of the pollutants into the harmless reaction products carbon dioxide, steam (water) and nitrogen.

The catalysts required for this purpose have to meet stringent requirements with respect to light-off performance, effectiveness, long-term activity and mechanical stability. For example, when used in motor vehicles, the catalysts must become active at low temperatures, and, in the long term, must guarantee a high percentage conversion of the pollutants to be removed in all the temperature and space velocity ranges in question.

At present, monolithic catalysts have been used as well as bead catalysts. Monolithic catalysts include either an inert metallic honeycomb or an inert, low-surface ceramic molding permeated by several parallel passages. The ceramic material may be, for example, cordierite, mullite or α-aluminum oxide. Moldings of cordierite are the preferred. This material has a favorable thermal expansion coefficient so that the support has good thermal shock properties. These properties are required to accommodate the rapid changes in temperature in catalytic converters of vehicles. A temperature-resistant layer is applied as support for the active catalyst components to the structure-reinforcing element of the monolithic catalyst. This support layer usually includes a mixture of an optionally stabilized, high-surface area aluminum oxide of the transition series, and one or more promoter oxides such as, rare earth oxides, zirconium oxide, nickel oxide, iron oxide, germanium oxide and barium oxide. A suitable stabilized aluminum oxide is described in German patent DE 38 39 580, which is entirely incorporated herein by reference.

The active catalyst components are usually metals of the platinum group, such as platinum, palladium and/or rhodium, wherein the ratio by weight of platinum and/or palladium to the rhodium optionally present is 1:1 to 30:1, according to DE-OS 38 30 318, which is entirely incorporated herein by reference.

The catalysis-promoting high-surface area support layer is applied by coating techniques known to those skilled in the art. To this end, a temperature-resistant, catalysis-promoting support material of high specific surface area (approx. 50 to 250 $m^2/g$) is applied by dipping the catalyst element into an aqueous dispersion of the support material (or "washcoat") or into a solution of the salt which can be thermally converted into the support material. After removal of excess dispersion or solution and subsequent drying, the coated catalyst element is calcined at temperatures of generally above 450° C. This procedure may have to be repeated several times to obtain the desired layer thickness.

Basically, the same process is also used to coat flat and corrugated metal foils (cf. Finnish patent 75 744, which is entirely incorporated herein by reference) which are subsequently further processed to honeycomb-like shapes by rolling or forming stacks of foils and introducing them into tubes, or by fixing, for example by means of axial rings or metal pins (cf. Finnish patent application 89 6294, which is also entirely incorporated herein by reference). Catalyst bodies produced in this way are used for exhaust emission control in the same way as catalytically coated perforated metal foils, for example according to DE-OS 39 39 921 or DE-OS 29 42 728, each of which are entirely incorporated herein by reference.

The catalytically active noble metals can be applied to the high-surface area support layer by the following two different methods.

In the first method, the particles of the coating dispersion are completely or partly impregnated before coating the catalyst element by addition of an aqueous solution of one or more soluble compounds of the noble metals to the dispersion. Subsequent coating of the catalyst element with the dispersion thus prepared gives a support layer in which the active components are uniformly distributed.

In the second method, the catalyst element is first coated with the coating dispersion. After drying of the layer, it is impregnated, for example, by immersion of the catalyst element in an aqueous solution of the noble metal compounds. In general, the active components are not uniformly distributed in the support layer thus impregnated. The concentration is high at the surface and decreases towards the bottom of the layer. By suitably controlling the impregnation process, the degree of inhomogeneity can be controlled and, hence, optimally adapted to the catalytic process.

To activate the catalyst, the noble metal components are normally reduced in a hydrogen-containing gas stream at temperatures of 250° to 650° C.

Basically, any of the temperature-resistant high-surface area support materials typical of catalysts and also their "precursors" may be used. Thus, the catalyst element may be coated with an aqueous dispersion of at least one compound from the group consisting of: oxides of magnesium, calcium, strontium, barium, aluminum, scandium, yttrium, the lanthanides, the actinides, gallium, indium, silicon, titanium, zirconium, hafnium, thorium, germanium, tin, lead, vanadium, niobium, tantalum, chromium, molybdenum, and tungsten. Furthermore, at least one member from the group consisting of: the carbides, borides, silicides and nitrides of the transition metals may be used as the support material. Hydroxides, carbonates, oxide hydrates, hydroxyl carbonates, oxalates, citrates, acetates and other readily decomposable compounds may serve as precursors of these materials.

Temperature-resistant support materials which synergistically enhance the effect of the actual catalytically active components are preferably used. Examples of such support materials are simple and composite oxides, such as active aluminum oxide, zirconium oxide, tin oxide, cerium oxide or other rare earth oxides, silicon oxide, titanium oxide, or silicates, such as aluminum silicate, or titanates, such as barium or aluminum titanate, and zeolites.

The various phases of active aluminum oxide of the transition series, which may be stabilized in accordance with DE 38 39 580 by doping with silicon oxide and lanthanum oxide and also with zirconium oxide and cerium oxide, have proven to be particularly successful temperature-resistant support materials. These support materials may be mixed or doped with promoters which, for example, increase the oxygen storage capacity of the catalyst as a whole. Suitable promoters are, in particular, the oxides of cerium, iron, nickel and/or zirconium. They have a favorable effect on the long-term activity of the catalyst and, in addition, afford advantages where the pollutants of internal combustion engines are simultaneously oxidized and reduced in a single catalyst bed.

Firm adhesion of the support layer to the catalyst element is essential to a long useful life of the catalyst. This is necessary given the rough conditions in which the catalyst is used in a motor vehicle, with its severe mechanical loads and constantly changing temperatures. In the case of a dispersion coating, the adhesion of the layer to the catalyst element is generally better if the solids of the coating dispersion are fine. Coating dispersions with particle sizes of the solids in the range from 1 to 15 μm are now state of the art. In this way, firmly adhering support layers approximately 5 to 200 μm thick can be applied to the catalyst bodies. A typical coating dispersion of this type is described in DE-PS 25 38 706, which is entirely incorporated by reference. The coating layer includes aluminum oxide and cerium oxide, both components having particle sizes below 3 μm. Another example of conventional coating dispersions is found in EP 0 073 703, which also is entirely incorporated herein by reference. This document describes coating dispersions having a very narrow particle size distribution in the range from 1 to 15 μm. To improve the adhesion of the dispersions, a binder of aluminum oxide hydroxide (for example boehmite, pseudoboehmite) or aluminum hydroxide (for example hydrargillite) is added.

The increasingly more stringent requirements of legislation, particularly the new Californian limits, necessitate further improvements in the catalysts.

In view of the test cycle (US-FTP 75) on which the new limits are based, a distinct improvement is required, particularly in light-off performance throughout the life of the catalyst. This is because, when the catalyst is warm from use, improvements are difficult to achieve on account of the high conversion rates typically reached even at the present time.

The careful handling of resources also calls for optimal utilization of the quantities of noble metals used. Accordingly, it is desirable to find coatings for catalysts which, for the same input of noble metals, show better activity than conventional catalysts.

According to EP 0 119 715 (which is entirely incorporated herein by reference), conversion rates can be increased in the case of homogeneously impregnated support layers by replacing 1 to 20% of the fine-particle solids of the coating dispersion with coarse-particle inactive material having a particle diameter of at least 44 μm and a relatively high percentage of macropores. In this proposed solution, the fine-particle solids are impregnated with the catalytically active noble metals before the coating dispersion is prepared, while the coarse-particle inert material remains unimpregnated. The function of the coarse-particle inert material is merely to bring the exhaust gases to be treated into better contact with the noble metal components uniformly distributed over the depth of the support layer via the macropores.

The success of this measure in improving light-off performance is questionable because the high-surface area solids valuable to the catalytic process are partly replaced by low-surface area material of no value to the catalytic process.

The coarse-particle material does not participate directly in the emission control process. This material first has to be heated by the exothermic reactions taking place on the catalytically active solids. As a result, heating of the catalyst to its operating temperature is slowed down so that the light-off performance of the catalyst is impaired.

There is an upper limit to the margin for improving catalytic activity by the method of EP 0 119 715, namely, for the same quantity of coating, any improvement in the diffusion of exhaust gases to the bottom of the support layer with increasing percentage content of the coarse-particle inactive material is precluded by a reduction in the catalytically active, fine-particle material. Accordingly, the percentage content of coarse-particle material (by weight) in the support layer is limited to at most 20%. Although the quantity of active aluminum oxide in the catalyst could be increased again by greater layer thicknesses, this would inevitably result in an increase in the backpressure and hence to a loss of performance of the engine. In addition, on account of the greater layer thickness, noble metal would also be deposited at greater depths together with the fine-particle material. The noble metals would therefore be more inaccessible to the gaseous pollutants. This would neutralize the advantages of improved exhaust diffusion by coarse-particle inert material. According to EP 0 119 715, the coarse-particle material is produced from reject catalysts which are said to be sensibly disposed of in this way. However, this has proven to be unfavorable in practice because the highly calcined catalyst bodies of cordierite or corundum lead to the premature wear of the grinding and coating tools on account of their high abrasiveness.

In addition, highly calcined, compact materials of the type in question tend to sediment in the coating dispersions. Thus, even where there are minor differences in the treatment of the coating dispersion (i.e., uneven stirring), this may result in differences in viscosity and, hence, to uneven coating results. For these reasons, the process in question has never been successfully adopted in practice.

SUMMARY OF THE INVENTION

It is an object of this invention to provide a coating dispersion which gives catalysts improved light-off performance, high conversion rates when the catalyst is warm from use and high long-term activity. Accordingly, one of the problems addressed by the present invention was to provide such a coating dispersion. In a more preferred embodiment of the invention, catalysts are provided which are not impregnated with the catalytically active noble metal components until after the dispersion coating has been applied. Such catalysts show an inhomogeneous distribution of these components in the support layer.

The present invention relates to a coating dispersion for the production of catalysis-promoting coatings on an inert, structure-reinforcing element. The coating includes an aqueous dispersion of one or more temperature-resistant support materials as solids and, optionally, one or more other solids and/or one or more dissolved compounds as promoters and/or active components. The solids of the dispersion in accordance with the invention have a multimodal particle size distribution with various particle fractions and both fine-particle solids and coarse-particle solids present in a high-surface area modification, the coarsest particle fraction having average particle diameters of 20 to 100 μm.

Additional objects of the present invention include developing a process for producing the coating dispersion and providing a monolithic catalyst using the coating dispersion.

BRIEF DESCRIPTION OF THE DRAWINGS

The invention will be discussed and better understood when considered in conjunction with the accompanying drawings wherein:

FIGS. 4a and 4b show isotherms on the outlet surface of the catalysts, wherein

DETAILED DESCRIPTION OF THE INVENTION

The invention is described in more detail in the following detailed description with reference to examples of embodiments of coating dispersions according to the invention. Catalyst bodies were coated with the dispersions and the effectiveness of the measures according to the invention was demonstrated by tests in which the catalysts according to the invention were compared with known catalysts.

This invention relates to a coating dispersion for catalysis-promoting coatings on an inert, structure-reinforcing element. The coating dispersion is an aqueous dispersion of one or more temperature-resistant support materials as solids, and, optionally, one or more other solids and/or one or more dissolved compounds as promoters and/or active components. At least one of the solids of the dispersion has a multimodal particle size distribution including both a fine-particle solids fraction and a coarse-particle solids fraction. The coarsest particle solids fraction has an average particle diameter in the range of 20 to 100 μm.

In one embodiment of the invention, all of the coating dispersion solids of the dispersion have a bimodal particle size distribution, with a fine-particle solids fraction and a coarse-particle solids fraction. Alternatively, the coating dispersion may include at least one solid having a bimodal particle size distribution, wherein at least one of the solids is present in only one of the fine-particle solids fraction or the coarse-particle solids fraction. For example, when promoters are present as solids, in one embodiment of the invention, the promoters may belong only to the fine-particle solids fraction.

The invention relates to a process for the production of a coating dispersion containing active aluminum oxide as a support material and at least one member selected from the group consisting of rare earth oxides, cerium oxide, zirconium oxide, nickel oxide, iron oxide, germanium oxide and barium oxide. The process includes providing a quantity of active aluminum oxide wherein a particle size distribution of the aluminum oxide corresponds to a coarse-particle solids fraction of the coating dispersion. A portion of the coarse-particle solids fraction of the aluminum oxide is wet ground, before, during or after adding a desired quantity of rare earth oxides, cerium oxide, zirconium oxide, nickel oxide, iron oxide, germanium oxide, or barium oxide and water to produce a fine-particle solids fraction. The fine-particle fraction is mixed with an unground portion of aluminum oxide to provide the bimodal distribution.

The invention also relates to a catalyst having the coating dispersion. The catalyst includes an inert, structure-reinforcing element for treating the exhaust gas of an internal combustion engine. A honeycomb-like inert ceramic or metal element is used for the catalyst with a dispersion coating containing active components of 0.01 to 10% by weight of platinum, palladium, and optionally rhodium or iridium. Preferably a ratio by weight of platinum to palladium of 1:10 to 10:1, and a ratio by weight of platinum and/or palladium to rhodium or iridium, optionally present, of 1:1 to 30:1 is used. The catalyst is obtained by coating the structure reinforcing element with a coating dispersion containing the noble metals, drying the dispersion coating in air at 250° C., and treating it at temperatures of 250° to 650° C., optionally in a hydrogen-containing gas stream. As discussed above, the coating dispersion used in accordance with the catalyst of the invention is a multimodal dispersion including an aqueous dispersion of one or more temperature-resistant support materials as solids, and, optionally, one or more other solids and/or one or more dissolved compounds as promoters and/or active components, wherein at least one of the solids of the dispersion has a multimodal particle size distribution including both a fine-particle solids fraction and a coarse-particle solids fraction, wherein the coarsest particle solids fraction has an average particle diameter in the range of 20 to 100 μm. Preferably, the dispersion is applied to the structure-reinforcing element in a quantity of 30 to 400 grams dry matter per liter catalyst volume. Alternatively, the catalyst may be obtained by coating the structure-reinforcing element with a coating dispersion, and then impregnating the dispersion coating, after drying in air at 250° C., with an aqueous solution of a salt or a mixture of salts of the noble metals. The impregnated element is then dried at temperatures of 250° to 650° C., optionally in a hydrogen containing gas stream.

The invention will be described in detail in conjunction with various specific examples of the invention. These examples should be construed as illustrating the invention, and not limiting the same.

The structure-reinforcing bodies used in this invention may be monoliths of ceramic or metal, and also flat, corrugated, perforated and/or slotted metal foils which are subsequently fashioned into monolithic supports. Perforated metal tubes of the type specifically proposed for the emission control of two-stroke engines may also be used.

Through the multimodal particle size distribution of the solids, the support layer also contains very coarse particle fractions. The coarser particle fractions provide the support layer with a rough surface which can be considerably enlarged in relation to the smooth surface of a support layer of typical catalysts consisting solely of fine-particle material. In the case of a support layer having a monolayer of close-packed spheres of which the diameter corresponds to twice the average layer thickness, a geometric surface enlargement by a factor of 1.9 could be achieved in relation to a smooth layer.

In addition to the pure geometric surface enlargement, however, another positive effect was obtained with the coating dispersion according to the invention. With the normal dimensions of the flow passages in prior catalyst elements and the gas flows occurring in the part throttle range of the engine, gas flow in the catalyst passages is laminar, except for a transition zone approximately 1 cm long behind the entry surface of the catalyst, in which the initially turbulent flow changes into a laminar flow.

The maximum conversion rates for the pollutants which can be achieved under these operating conditions are not normally limited by the activity potential of the catalytic components. Instead, the rates are limited by the transport of gas from the gas stream to the coated passage walls. On account of the laminar flow form in the known catalysts, this transport takes place via a relatively slow diffusion process so that the activity potential of the catalytically active components cannot be fully exhausted.

The coating dispersion according to the invention has proven to be of particular advantage under precisely these operating conditions because the rough surface leads to additional swirling and, hence, to a more intensive exchange and contact between the exhaust gases and the coating surface. This is particularly favorable in the case of inhomogeneously impregnated support layers with the maximum noble metal concentration in regions of the layer near the surface. Thus, the coating dispersion according to the invention leads to two mutually enhancing, positive effects, namely:

a) to an enlargement of the active geometric catalyst surface; and b) to a better interaction between the catalyst surface and the exhaust gases by swirling of the exhaust gases in the vicinity of the surface.

These two effects produce an improvement in light-off performance in relation to the prior art and an improvement in the degree of conversion of the pollutants for the same input of noble metals, because the activity potential of the noble metal components is now better and more fully utilized. However, the effective utilization of these positive effects does presuppose that all the particle fractions of the solids of the coating dispersion are present in an active, high-surface form of which the large specific surface (BET surface as determined in accordance with DIN 66 132) is fully available for accommodating the catalytically active metal components.

The surface roughness of the coating dispersion according to the invention is largely attributable to the coarse-particle fractions of the solids. The larger the average particle diameter of the coarse particle fraction, the greater the surface roughness and, hence, the greater the extent to which the exhaust gases are swirled. At the same time, there is a slight increase in backpressure with increasing surface roughness. It has now been found that optimal surface roughness is determined as a function of the diameter of the exhaust gas passages of the catalyst monolith. The ratio of surface roughness of the coating, measured as average square roughness, to the free passage diameter after coating should be in the range from 0.02 to 0.1. This empirically observed correlation makes it necessary to coordinate the thickness of the coating and the average particle size of the coarse particle fractions suitably with one another taking the remaining free passage diameter into consideration.

For typical coating thicknesses of 20 to 40 μm and typical passage diameters of 1 mm, average particle diameters of the coarse particle fractions of the coating dispersion of 20 to 100 μm have proven to be effective. With these dimensions, the increased surface roughness of the monolithic catalyst bodies still does not lead to any measurable loss of performance of the engine through a slight increase in the backpressure.

The advantageous effects of the coating dispersion according to the invention may be obtained by a bimodal particle size distribution of all the solids of the dispersion. To adapt the properties of the final catalyst to the requirements of the particular application, it is of advantage if some or all of the solid materials belong to only one particle fraction of the dispersion.

To obtain optimal surface enlargement of the support layer and swirling of the exhaust gases coupled with firm adhesion of the support layer to the catalyst element, the distribution maximum of the fine-particle fraction should be between 1 and 10 μm. The use of extremely fine-particle materials, such as sols, gels and pseudoboehmites, is less favorable because these materials can block the pores of the coarse-particle fraction and the pores between the particles and, hence, can lead to inferior catalytic activity by complicating the exchange of material. The ratio by weight of fine-particle fraction to the coarse-particle fraction can be adjusted to a value in the range of 20:1 to 1:2, wherein ratios by weight in the range of 12:1 to 2:1 have proven to be particularly advantageous.

With a ratio by weight of 1:2, theoretically, the maximum possible surface enlargement of the coating is obtained under idealized conditions. However, it has been found that the optimal effect of the measures according to the invention on the light-off performance and activity of the catalyst are actually developed with the above-mentioned ratios by weight of the fine-particle fraction to the coarse-particle fraction in the range of 12:1 to 2:1. The turbulence effect on the exhaust gases evidently reaches its maximum at these ratios by weight. Although a further increase in the coarse-particle component leads to further enlargement of the surface of the coating, it also leads presumably to a reduction in the swirling of the exhaust gases which destroys the positive effect of the surface enlargement.

For the swirling effect on the exhaust gases, it is sufficient for only the high-surface area support material to have a bimodal particle size distribution. By contrast, the promoters need only be present in the fine-particle fraction.

Oxidic materials may be used as the temperature-resistive support material. Examples of these materials are at least one member selected from the group consisting of: aluminum oxide, titanium oxide, silicon oxide, tin oxide, zirconium oxide, magnesium oxide, rare earth oxides aluminum silicate, zeolites and/or alkaline earth metal titanate, optionally in doped form. For example, active aluminum oxide stabilized against phase transfer with lanthanum or zirconium, zirconium oxide doped with cerium or yttrium or ion-exchanged zeolites may be used as doped support materials.

One or more compounds of the transition metals, rare earths, alkaline earth metals and/or compounds of the elements of the 3rd to 5th main groups are preferably used as promoters.

In one particularly favorable embodiment of the coating dispersion according to the invention, the temperature-resistant support material is made from an active, optionally stabilized aluminum oxide having a specific BET surface area of 50 to 350 m$^2$/g, and preferably 100 to 200 m$^2$/g, and has a total pore volume of 0.3 to 2 ml/g. In this embodiment, the ratio by weight of the fine-particle fraction to the coarse-particle fraction is in the range of 18:1 to 1:1, and preferably 12:1 to 7:1. Particularly good results have been obtained with materials wherein the total pore volume is formed substantially equally by mesopores having pore diameters of 2 to 50 nm and macropores having pore diameters of greater than 50 nm.

In addition to the support material, aluminum oxide, the dry matter of the dispersion may contain 3 to 70% by weight cerium oxide, 0 to 25% by weight zirconium oxide, 0 to 15% by weight other rare earth oxides, 0 to 15% by weight nickel oxide, 0 to 10% by weight iron oxide, 0 to 10% by weight germanium oxide and 0 to 10% by weight barium oxide, as promoters.

To produce a coating uniformly doped with catalytically active metal components, the metal components may be added to the dispersion. To this end, 0.01 to 10% by weight noble metals in elemental form or in the form of their compounds, preferably platinum, palladium and/or rhodium or iridium, are added to the dispersion, based on its dry matter. The ratio by weight of platinum to palladium should be in the range of 1:10 to 10:1, while the ratio by weight of platinum and/or palladium to the rhodium or iridium optionally present should be in the range of 1:1 to 30:1. The noble metal may be essentially entirely deposited on the coarse-particle solids fraction.

When the catalytically active noble metals are applied, other catalytically positive effects can be obtained by the coarse particle fraction, when the coarse particles project from the substrate preferentially adsorbing a noble metal salt so that the salt accumulates there. An inhomogeneous noble metal composition of that surface of the coating which faces the gases can be established in this manner. A comparable and likewise advantageous effect can be achieved by coating the coarse-particle component beforehand with a noble metal component and mixing it with the fine-particle solid.

The invention also relates to a process for the production of a bimodal coating dispersion. This method is characterized in that the solids are initially present in a particle size distribution corresponding to the coarse-particle fraction of the final coating dispersion. The solids are partly wet-ground to the particle size distribution of the fine-particle fraction, and the ground material is subsequently mixed homogeneously with the remaining quantity of solids. Of course, fine-particle and coarse-particle solids of appropriate particle size can also be mixed without grinding. However, this can often have the disadvantage that the adhesion of the coating dispersion to the catalyst element is inadequate.

More particularly, a coating dispersion containing active aluminum oxide as a support material and cerium oxide, zirconium oxide, nickel oxide, iron oxide, germanium oxide and barium oxide as promoters can be produced by a process wherein a quantity of aluminum oxide having the particle size distribution corresponding to the coarse-particle fraction of the final coating dispersion is wet-ground to provide the necessary bimodal distribution of the aluminum oxide and to provide the particle size distribution of the fine-particle fraction. The desired quantities of cerium oxide, zirconium oxide, iron oxide, germanium oxide, barium oxide and water are added. Subsequently, the ground material is mixed homogeneously with the remaining unground quantity of aluminum oxide.

The invention also relates to providing a monolithic catalyst including the coating dispersion in accordance with the invention. This method is characterized in that a multimodal dispersion according to the invention is used as the oxidic coating dispersion and is applied to a catalyst element in a quantity in the range of 30 to 400 grams, preferably 100 to 300 grams and, more preferably, 120 to 270 grams dry matter per liter of catalyst volume. The noble metals may be directly included into the dry matter of the dispersion. The quantity applied is determined by the geometric surface of the catalyst element to be coated, i.e., by the cell density in the case of typical monoliths with free-flow passages. The final coating of this catalyst, wherein the noble metals are included in the dry matter of the dispersion, shows a uniform distribution of noble metals over the depth of the coating.

However, one particularly preferred embodiment of the catalyst according to the invention is obtained if the coating dispersion used is a dispersion which is applied to the catalyst in a quantity in the range of 30 to 400 grams, preferably 100 to 300 grams and, more preferably, 120 to 270 grams per liter catalyst element. Subsequently, the catalyst is impregnated with the catalytically active metal components so that it generally shows an inhomogeneous distribution of metals, wherein the concentration of noble metal at the surface is greater than at the bottom of the layer.

Another advantage of the coating dispersion according to the invention is its ability to uniformly coat the passages of catalyst bodies, more particularly those passages having non-porous walls, such as metal supports. The coating dispersions in accordance with the invention more uniformly coat such walls than conventional coating dispersions. A considerable accumulation of the layer material in the corners of the passages is observed in the case of conventional coating dispersions, as a result of the surface tension of the dispersion. In the coating dispersion according to the invention, this effect is reduced by the coarse-particle fractions. Accordingly, the activity of the catalyst and, hence, heating of the catalyst under the effect of the exothermic reaction processes are more uniformly distributed over the cross-section of a catalyst passage. Together with the overall more intensive exchange of the exhaust gases with the catalyst surface in the passages, this leads to a more uniform distribution of temperature over the entire cross-section of the catalyst element.

When a flat, corrugated, perforated and/or slotted metal foil is used as the element, the catalyst according to the invention can also be obtained by using the metal foil for the production of a monolithic molding by subsequent forming, cutting, stacking, and winding. Although, in this embodiment, the layer material is unlikely to accumulate in the corners of the passages as a result of the production process, the coarse particles of the dispersion according to the invention are again advantageous with respect to the swirling of the exhaust gases. In addition, at those places where the coated metal foils are in contact with one another, advantages arise out of the fact that the coarse particles interengage and make it difficult for two foils to shift relative to one another.

The same advantages as in the coating of a non-pretreated element are obtained when the multimodal coating dispersion is applied as an outer layer to at least one base layer or an interlayer of catalytically neutral and/or catalytically active fine-particle material.

The expression "catalytically neutral" applies to interlayers which are applied before dispersion coating, for example to improve adhesion (DE-OS 23 04 351, which is entirely incorporated by reference). In particular embodiments of the catalysts, it is proposed, for example in DE-OS 38 35 184 (which is entirely incorporated herein by reference), to make up the catalysts from several vertically adjacent layers of different composition. With a catalyst construction such as this, it is readily possible and sufficient to produce the catalyst solely with an outer layer of the multimodal coating dispersion according to the invention, and still obtain the advantages in accordance with the invention.

Another embodiment of the catalyst is characterized in that an outer layer of active and/or protective fine-particle material is applied to a coating obtained from a multimodal coating dispersion. With thin outer layers, the advantages of the dispersion according to the invention can be obtained even when only the lower layer has the high surface roughness according to the invention. In this case, the particle size to be selected for the coarse-particle fraction is determined by the thickness of the outer layer to be applied.

Comparatively thin outer layers of the type in question may be present in the form of catalytically active material in catalysts having a layered structure, for example according to DE-OS 38 35 184. They may also be made of catalytically inert, fine-particle material and may serve to protect the underlying catalyst layer, for example against catalyst poisons (DE-OS 31 46 004 and EP 0 179 578, which are each entirely incorporated herein by reference), or to keep unwanted reactants away. A lower layer of the coating dispersion according to the invention may also be used with advantage to improve the adhesion of the outer layer through the anchorage to rough surfaces.

The invention will now be described in conjunction with various specific examples.

Honeycombs of cordierite 102 mm in length and 152 mm in diameter with 62 passages per $cm^2$ were used as the catalyst bodies. The wall thicknesses of the passages were 0.16 mm.

Two different aluminum oxides, aluminum oxide A and aluminum oxide B, having the following properties were used as support materials for the coating dispersions:

|  | Aluminum oxide A | Aluminum oxide B |
| --- | --- | --- |
| Average particle diameter: | 60 μm | 23 μm |
|  | 90% >3 μm | 90% >2.8 μm |
|  | 10% >76 μm | 10% >33 μm |
| Specific surface area: | 180 $m^2/g$ | 140 $m^2/g$ |
| Mesopores ($\phi$ 2–5 nm): | 0.48 ml/g | 0.48 ml/g |
| Macropores ($\phi$ >50 nm): | 0.52 ml/g | 0.52 ml/g |

In accordance with the above list of properties, the two support materials essentially differ from one another in their particle size and their specific surface. Their pore radius distributions were substantially the same. For an average particle diameter of 60 μm, 90% of the particles of aluminum oxide A had a diameter larger than 3 μm and 10% of the particles a diameter larger than 76 μm. The corresponding data for aluminum oxide B can be found in the above list. Both aluminum oxide qualities were pure γ-aluminum oxide with no stabilizing additives.

The promoters used were cerium oxide, zirconium oxide, iron oxide and barium oxide which were added to the dispersion partly as solids and partly as soluble acetate or nitrate compounds.

The catalyst bodies were coated by immersion in the coating dispersion. Excess dispersion was removed with compressed air. The catalyst bodies were then dried in air for 1 hour at 250° C. The catalyst precursors thus obtained were then impregnated with an aqueous solution of platinum tetramine nitrate and rhodium nitrate and, after drying for 3 hours at 300° C. were calcined in air for 3 hours at 600° C. For activation, the catalysts were finally reduced in a stream of hydrogen for 2 hours at 600° C. The content of platinum and rhodium in the impregnating solution was selected so that a ratio by weight of platinum to rhodium of approximately 5:1 was established in the finished catalysts.

The performance tests of the coated catalyst bodies were carried out on an engine test stand with a 1.8 liter gasoline engine (66 KW) equipped with a Bosch KE-Jetronic. The pollutant conversions obtainable with the catalysts were measured at various normalized air-to-fuel ratios (lambda ($\lambda$) - - - ; To simulate real operating conditions, the exhaust gas composition was modulated at predetermined average lambda values by periodically changing the air-to-fuel ratio (A/F). To this end, air pulses were applied to the exhaust gas stream or the KE-Jetronic was correspondingly manipulated.

In addition, photographs of the outlet surface of the catalysts were taken with an infrared camera in order to monitor temperature exchange between the exhaust gases and the catalyst element. These photographs were used to determine temperature distribution over the outlet cross-section of the catalysts 1 minute after exposure of the catalysts to air or exhaust gas at a preselected temperature.

Finally, the catalysts were subjected to the US-FTP 75 test to determine the effect of the measures according to the invention on the results of this test cycle on which the new U.S. exhaust emission limits are based.

The emission control effect of the catalysts was measured both in their fresh state and after aging in the engine. Engine aging included two operating phases which were periodically repeated to completion of engine aging. During the first 50 minutes, the engine was operated at full throttle, i.e. at 5600 r.p.m. under a load of 86 Nm.

A lambda value of 0.993 and an exhaust temperature before the catalyst of 1000° C. were established. In the second operating phase, lasting only 10 minutes, air was added to the exhaust stream for the same engine operating data. The lambda value was thus increased to 1.04, and the exhaust temperature rose to 1050° C.

Example 1

A coating dispersion was produced containing two different particle fractions of aluminum oxide A. The promoters included were cerium oxide and zirconium oxide, present as solids.

Figure 1:
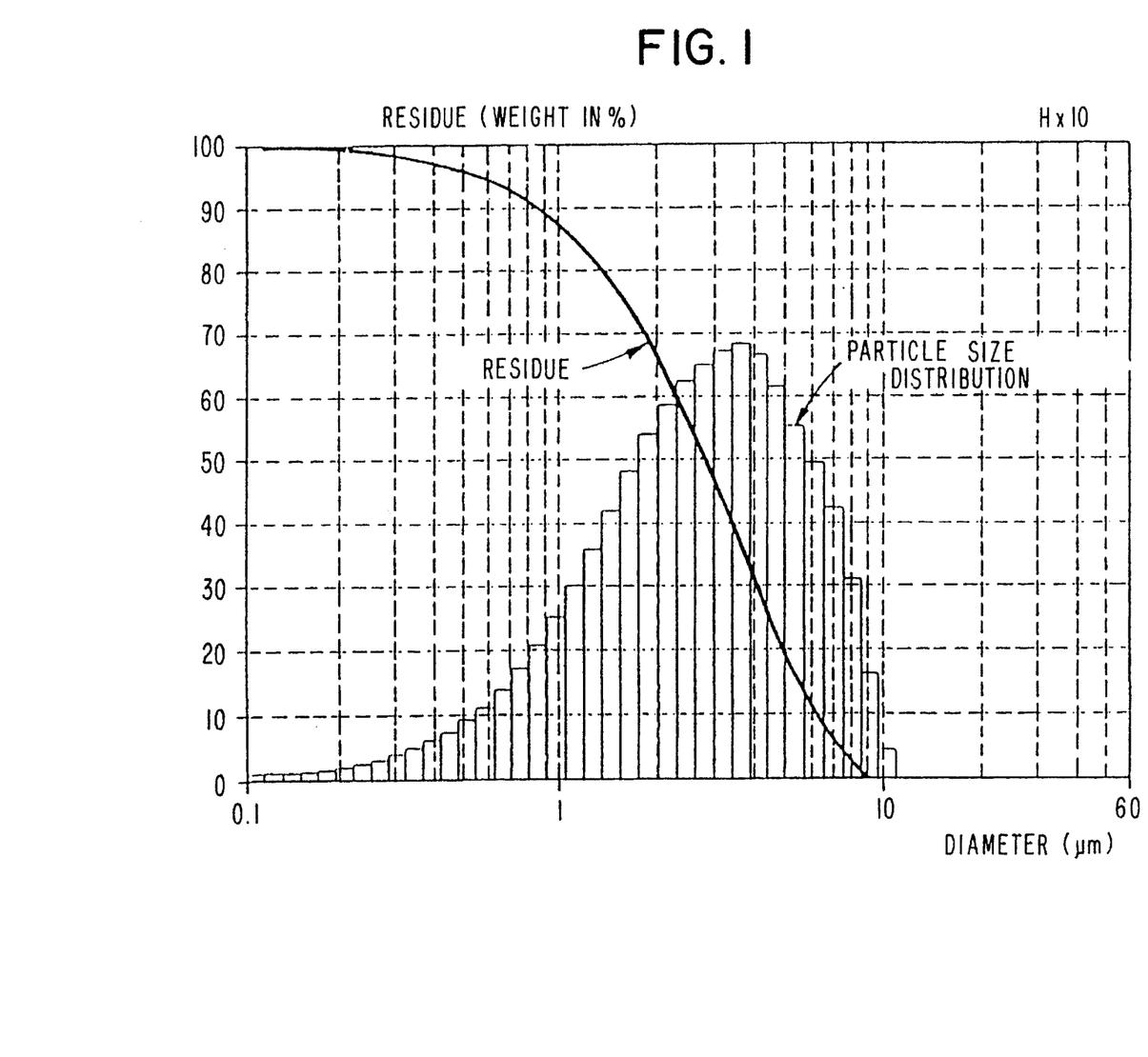
FIG. 1 shows the particle size distribution of a known coating dispersion corresponding to Comparison Example 1.
Figure 2:
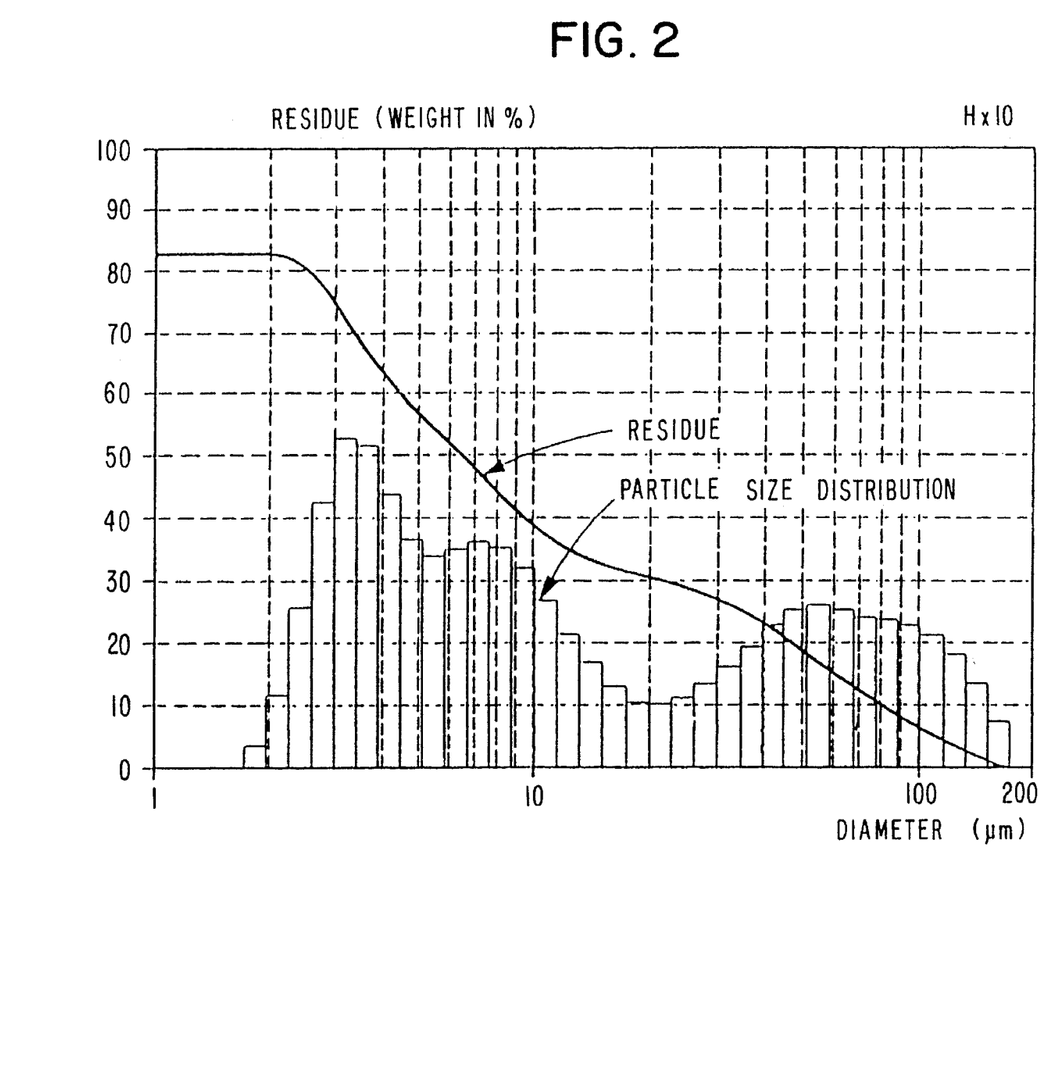
FIG. 2 shows the particle size distribution of a coating dispersion according to the invention corresponding to Example 1.

To prepare the dispersion, 3 liters of water was provided. Thirty grams of zirconium oxide, 400 grams of aluminum oxide A and 400 grams of cerium oxide (specific surface area 25 $m^2/g$) were successively added to the water. The average particle size of the promoters corresponded to that of the aluminum oxide A. The dispersion was wet ground until a particle size distribution with a distribution maximum at approximately 2.8 μm, corresponding to the particle size distribution illustrated in FIG. 1, had been reached. The particle size distribution was measured with a Cilas granulometer. It corresponds to the particle size distribution used for the production of conventional catalysts. After this grinding phase, another 400 grams of unground aluminum oxide A was added to the dispersion and the dispersion was homogenized. The particle size distribution of this coating dispersion according to the invention had the bimodal character shown in FIG. 2.

Catalyst bodies were coated with this coating dispersion according to the invention and subsequently impregnated and activated. The catalysts thus produced contained about 123 grams of washcoat having 80 grams γ-aluminum oxide, 40 grams cerium oxide, 3 grams zirconium oxide, 1.17 grams platinum and 0.235 grams rhodium per liter honeycomb volume.

The catalysts prepared according to Example 1 are named K1 in the following.

Comparison Example 1

A coating dispersion containing only one particle fraction of aluminum oxide A was prepared. The promoters cerium oxide and zirconium oxide were included as solids.

To compare the catalytic properties of the catalysts according to the invention of Example 1, more particularly their light-off performance, with those of known catalysts, comparison catalysts were produced in the same way as described in Example 1. In contrast to Example 1, however, the total quantity of γ-aluminum oxide of 800 grams was wet-ground together with the promoters to the particle size distribution of FIG. 1.

The catalysts prepared according to Comparison Example 1 are named VK1 in the following.

The surface structure of the support layers and layer thickness distribution of catalysts K1 (Example 1) and VK1 (Comparison Example 1) were compared.

The catalyst bodies were cut up longitudinally and the passage webs were examined under a microscope. The honeycombs treated with the coating dispersion of Example 1 according to the invention had a considerably rougher surface than the catalyst bodies coated in accordance with the prior art. This effect was particularly clear in the middle of the webs, where the layer thicknesses are at their smallest due to the surface tension of the coating dispersion.

Figure 3:
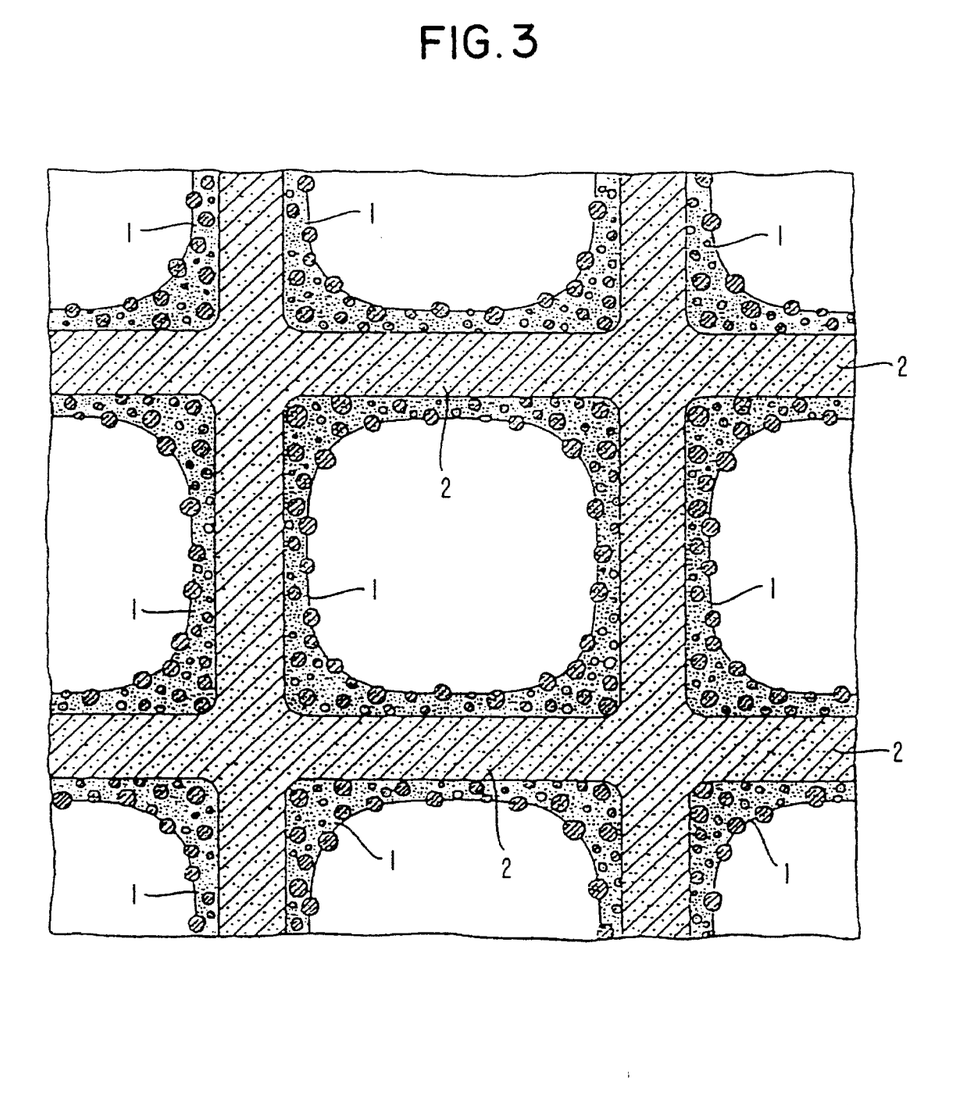
FIG. 3 diagrammatically illustrates a catalyst cross-section.

Scanning electron micrographs of cross-sections of the catalyst bodies showed the coating conditions diagrammatically illustrated in FIG. 3. Reference number 1 denotes the support layer, and reference number 2 shows the passage wall of cordierite. Due the surface tension of the coating dispersion, more coating material accumulates at the corners of the passages than at the middle of the webs. This effect is weaker in the case of the coating dispersion according to the invention. The average layer thicknesses at the middle of the webs where the coating dispersion according to the invention of Example 1 was used were approximately 34 μm while the support layers of Comparison Example 1 only had an average layer thickness at the middle of the webs of approximately 16 μm.

The light-off performance of the catalysts was compared both in the fresh state and after aging for 20 hours, and the conversion of the pollutants (carbon monoxide, hydrocarbons, nitrogen oxides) was determined as a function of the exhaust gas temperature before the catalyst. This was done under equilibrium conditions by increasing the exhaust gas temperature in steps using a heat exchanger. During these tests, the engine was operated under part throttle (3000 r.p.m. for a load of 30 Nm) so that the catalyst was exposed to a space velocity of 60,000 $h^{-1}$. The exhaust gas composition was varied in the stoichiometrically rich range (lambda=0.995) by periodic pulsing of air at 1 Hz; ±0.5 A/F. The results of the light-off testing are shown in Table 1.

TABLE 1

Catalysts of Example 1 (K1)
and Comparison Example 1 (VK1)
Light-off temperatures T50% for the conversion
of CO, HC and NOx

| Catalyst | State | T50% [°C.] | | |
|---|---|---|---|---|
| | | CO | HC | NOx |
| K1 | Fresh | 335 | 337 | 319 |
| VK1 | Fresh | 340 | 345 | 321 |
| K1 | Aged for 20 h | 331 | 336 | 321 |
| VK1 | Aged for 20 h | 336 | 339 | 325 |

Lambda: 0.995
Space velocity: 60,000 $h^{-1}$
Exhaust gas modulation: 1 Hz; ±0.5 A/F Table 1 shows a more favorable light-off temperature for the catalysts of Example 1 (K1) according to the invention as compared to Comparison Example 1 (VK1).

The conversion of carbon monoxide, hydrocarbons and nitrogen oxides was tested on the catalysts K1 and VK1 warm from use at an exhaust gas temperature of 450° C. The catalysts were tested under otherwise the same operating conditions as described above, at three different lambda values, namely 0.995; 0.999 and 1.008.

The results of these measurements are set out in Table 2.

TABLE 2

Catalysts of Example 1 (K1)
and Comparison Example 1 (VK1)
Conversion of CO, HC and NOx at various air ratios

| Cat-alyst | Conversion [%] at | | | | | | | | |
|---|---|---|---|---|---|---|---|---|---|
| | λ = 0.995 | | | λ = 0.999 | | | λ = 1.008 | | |
| | CO | HC | NOx | CO | HC | NOx | CO | HC | NOx |
| Fresh state | | | | | | | | | |
| K1 | 92.9 | 95.4 | 82.4 | 95.2 | 95.5 | 76.2 | 98.1 | 95.4 | 68.1 |
| VK1 | 90.3 | 94.1 | 75.7 | 92.3 | 94.2 | 70.4 | 95.6 | 94.2 | 64.1 |
| Aged at 20 h | | | | | | | | | |
| K1 | 93.2 | 95.3 | 80.3 | 95.0 | 95.4 | 75.0 | 98.3 | 95.2 | 64.2 |
| VK1 | 89.3 | 93.5 | 72.2 | 90.9 | 93.6 | 69.7 | 95.4 | 93.6 | 60.7 |

Exhaust gas temperature: 450° C.
Space velocity: 60,000 $h^{-1}$
Exhaust gas modulation: 1 Hz; ±0.5 A/F Great conversion differences are observed in the case of catalysts warm from use, i.e., under operating conditions where pollutant conversion is limited by mass transport of the exhaust components from the gas phase to the catalyst surface. The conversion of all pollutant components, but especially the conversion of the nitrogen oxides, is distinctly better in the catalyst of Example 1 (K1) according to the invention than in the conventional catalyst according to Comparison Example 1 (VK1). As shown in Table 2, this applies to catalysts both in the fresh state and after engine aging.

The temperature distribution over the outlet cross-section of catalysts K1 and VK1 also was measured. By virtue of the rough coating surface, the coating dispersion according to the invention with the bimodal particle size distribution of the aluminum oxide leads to better swirling of the exhaust gases and hence to a better transfer of heat from the exhaust gases to the catalyst surface.

To demonstrate these properties, the following measurements were carried out with the catalysts of Example 1 and Comparison Example 1.

Figure 4A:
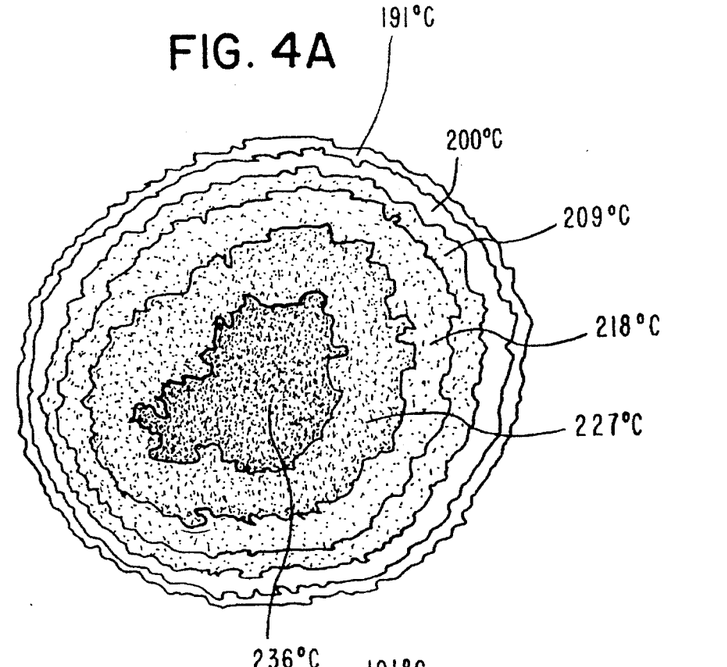
FIG. 4a shows a catalyst according to Comparison Example 1.
Figure 4B:
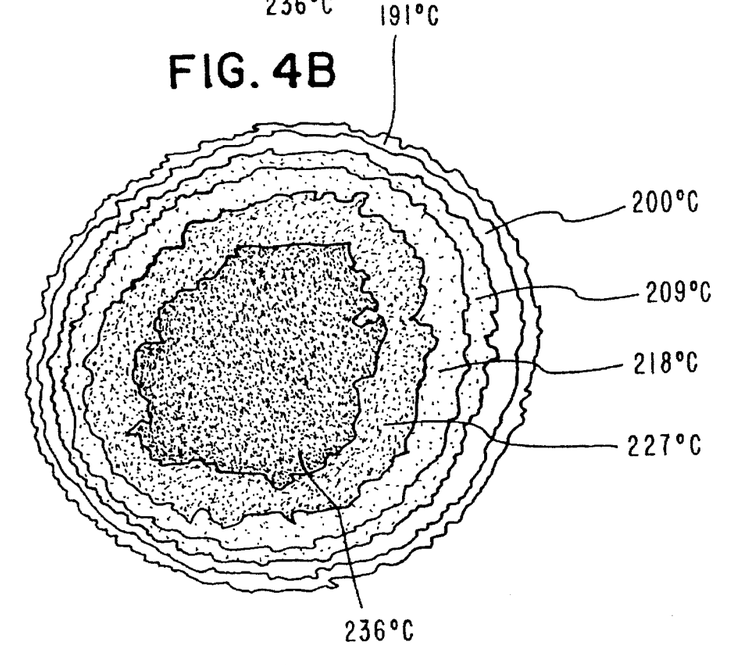
FIG. 4b shows a catalyst according to Example 1 of the present invention.

The catalysts were installed in a converter provided with a cone having an opening angle of 9°. This converter was fitted to an air blower equipped with a heating element and a throughflow meter. The air throughput of the blower was adjusted to 80 kg/h and the nominal temperature of the air was adjusted to 320° C. The heat was switched on and the temperature distribution of the outlet surface of the catalyst was recorded by means of an infrared camera exactly 1 minute after the air had reached the temperature of 320° C. at the catalyst entrance. FIGS. 4a and 4b show the isotherms obtained therefrom over the cross-section of the outlet surface. In the case of the catalyst of Example 1 according to the invention (FIG. 4b), a considerably greater part of the outlet surface has reached the highest temperature after 1 minute than is the case with the catalyst of Comparison Example 1 (FIG. 4a). This proves that the transfer of heat is considerably better in the catalyst according to the invention with the rough surface coating than in a known catalyst.

Example 2

This Example compares a coating dispersion of aluminum oxide A and aluminum oxide B, which differ in their particle size distribution. The promoters cerium oxide, zirconium oxide, iron oxide and barium oxide were included as solutions.

In Example 1, the fine component of the coating dispersion was obtained by grinding part of the coarse-particle starting material (aluminum oxide A). In this coating dispersion, therefore, the coarse and fine components had the same chemical composition and, apart from the particle size distribution, substantially the same physical properties as well (specific surface, pore volume).

Two different aluminum oxide qualities were used in Example 2. In addition, the promoters were added to the dispersion in the form of salt solutions.

As in Example 1, aluminum oxide A was again used as starting material for the fine-particle fraction of the dispersion.

To prepare the dispersion, 3 liters water was provided. 850 grams of aluminum oxide A were stirred into this quantity of water. Zirconyl acetate corresponding to 85 grams zirconium oxide, cerium acetate corresponding to 167 grams cerium oxide, iron nitrate corresponding to 32 grams iron oxide and, finally, barium oxide corresponding to 50 grams barium oxide were then successively added. The dispersion was wet-ground to a particle size distribution with a distribution maximum at approximately 2.8 μm corresponding to FIG. 1.

After grinding, 150 grams aluminum oxide B were added. The coating dispersion was carefully homogenized. Catalyst bodies were then coated with the dispersion. These catalyst precursors were then dried, impregnated with platinum and rhodium, calcined and reduced for activation in the same way as already described. The finished catalysts contained about 160 grams coating material composed of 120 grams γ-aluminum oxide, 20 grams cerium oxide, 10 grams zirconium oxide, 5 grams iron oxide, 5 grams barium oxide, 1.17 grams platinum and 0.235 grams rhodium per liter honeycomb volume.

The catalysts of Example 2 were named K2 in the following.

Comparison Example 2

To compare with catalyst K2 of Example 2, a coating dispersion of aluminum oxides A and B with the same particle size distribution was produced. The promoters cerium oxide, zirconium oxide, iron oxide and barium oxide were included as solutions.

850 grams aluminum oxide A and 150 grams aluminum oxide B were stirred into 3 liters water. Zirconyl acetate corresponding to 85 grams zirconium oxide, cerium acetate corresponding to 167 grams cerium oxide, iron nitrate corresponding to 32 grams iron oxide and barium acetate corresponding to 50 grams barium oxide were then added. The dispersion was wet-ground until a uniform particle size distribution for all the solids corresponding to FIG. 1 had been reached. A catalyst element was coated with this coating dispersion in the same way as described in Example 1. The catalyst precursor thus produced contained 160 grams coating dispersion per liter honeycomb volume, this quantity being composed of 120 grams γ-aluminum oxide, 20 grams cerium oxide, 10 grams zirconium oxide, 5 grams iron oxide and 5 grams barium oxide.

This catalyst precursor was impregnated with platinum and rhodium in the same way as in Example 2. The finished catalyst contained 1.17 grams platinum and 0.235 grams rhodium per liter honeycomb volume.

The catalysts of Comparison Example 2 are named VK2 in the following.

The conversion of carbon monoxide, hydrocarbons and nitrogen oxides by the catalysts of Example 2 (K2) and Comparison Example 2 (VK2) was measured after aging for 80 hours at lambda values of 0.999, at an exhaust gas temperature of 450° C. and at a space velocity of 60,000 $h^{-1}$. The exhaust gas composition was periodically varied by pulsing the exhaust gas stream with air at 1 Hz - - - ; - - - ±0.5 A/F and 1 Hz - - - ; - - - ±1.0 A/F. The results of this activity test are set out in Table 3. It can be seen from Table 3 that the catalysts of Example 2, according to the invention, show a distinctly better conversion for all three pollutant components and especially for the conversion of the nitrogen oxides, as compared to the catalysts of Comparison Example 2.

TABLE 3

Catalysts of Example 2 (K2) and Comparison Example 2 (VK2) Conversion of CO, HC and NOx

| | Conversion [%] at | | | | | |
|---|---|---|---|---|---|---|
| | 1 Hz; ±0.5 A/F | | | 1 Hz; ±1.0 A/F | | |
| Catalyst | CO | HC | NOx | CO | HC | NOx |
| K2 | 95.6 | 90.4 | 83.8 | 92.9 | 90.6 | 74.8 |
| VK2 | 93.7 | 89.5 | 77.9 | 90.7 | 90.1 | 71.2 |

Lambda: 0.999;
Exhaust gas temperature: 450° C.
Space velocity: 60,000 $h^{-1}$
Aging: 80 h Example 3a A coating dispersion of aluminum oxide A and aluminum oxide B differing in their particle size distribution was prepared. The promoters cerium oxide and zirconium oxide were included as solutions.

To prepare the dispersion, 3 liters water was provided. 850 grams aluminum oxide A were stirred into this quantity of water. Zirconyl acetate corresponding to 30 grams zirconium oxide and cerium acetate corresponding to 600 grams cerium oxide were then successively added. The dispersion was wet-ground until a particle size distribution with a distribution maximum at approx. 2.8 µm corresponding to FIG. 1 had been reached.

After grinding, 150 grams aluminum oxide B were added. The coating dispersion was carefully homogenized. Catalyst bodies were then coated with the dispersion. These catalyst precursors were dried, impregnated, calcined and reduced for activation in the same way as already described.

The finished catalysts contained, per liter honeycomb volume, about 163 grams coating material composed of 100 grams γ-aluminum oxide, 60 grams cerium oxide, 3 grams zirconium oxide, 1.17 grams platinum and 0,235 grams rhodium. These catalysts are named K3a in the following.

Example 3b

A coating dispersion of aluminum oxide A and aluminum oxide B differing in their particle size distribution was prepared. The promoters cerium oxide and zirconium oxide were included as solutions.

A coating dispersion was produced in the same way as in Example 3a, but with different ratios by weight between aluminum oxides A and B. The proportion of aluminum oxide A was 700 grams and the proportion of aluminum oxide B 300 grams. Accordingly, the catalysts produced with this coating dispersion contained a greater proportion of coarse aluminum oxide B. They are named K3b in the following.

Comparison Example 3

A coating dispersion of aluminum oxides A and B with the same particle size distribution was prepared. The promoters cerium oxide and zirconium oxide were included as solutions.

For this Comparative Example, a coating dispersion having the same composition as in Example 3b was prepared. In accordance with known processes, however, aluminum oxides A and B were given the same particle size distribution by grinding together as in Comparison Example 2. The catalysts produced with this coating dispersion are named VK3 in the following.

The distribution of temperatures over the outlet cross-section of catalysts K3a, K3b and VK3 was determined in the same way as in Example 1, except that hot engine exhaust gases (and not hot air, as in Example 1) now flowed through the catalysts. To this end, the catalysts were installed in a test converter provided with a 9° cone. This converter was placed in the exhaust tract of engine on an engine test stand. A heat exchanger was arranged between the exhaust manifold and the converter entrance to enable the exhaust temperatures to be adjusted irrespective of the engine speed and the engine load.

The engine was operated at a stable operating point (lambda=0.999; rotational speed=2500 r.p.m.; load=70 Nm). By means of the heat exchanger, the exhaust temperature before entering the converter was successively adjusted to 220°, 240°, 260° and 280° C. Temperature distribution over the outlet cross-section of the catalyst element was recorded by an infrared camera exactly 1 minute after the exhaust gases had reached one of the above-mentioned temperatures before the catalyst.

Figure 5:
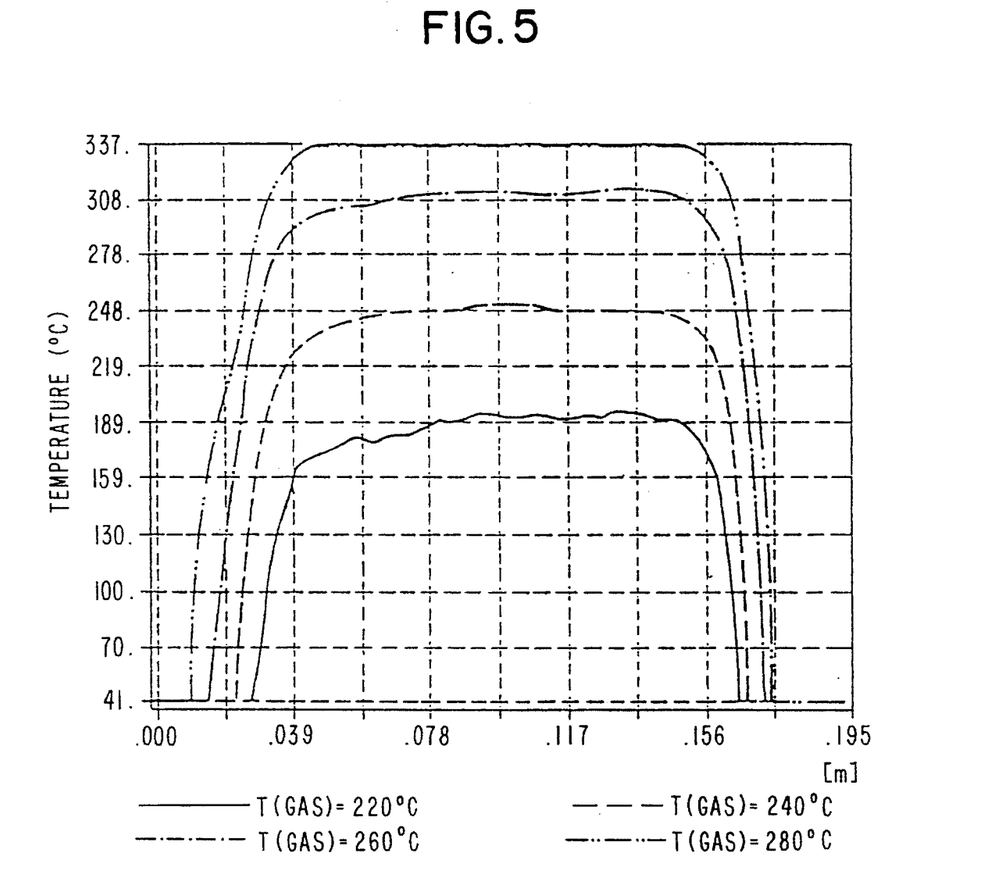
FIG. 5 shows the distribution of temperature over the cross-section at the outlet of the catalysts according to the invention of Example 3a, One minute after the exhaust gases have reached the temperatures shown before the catalyst.
Figure 6:
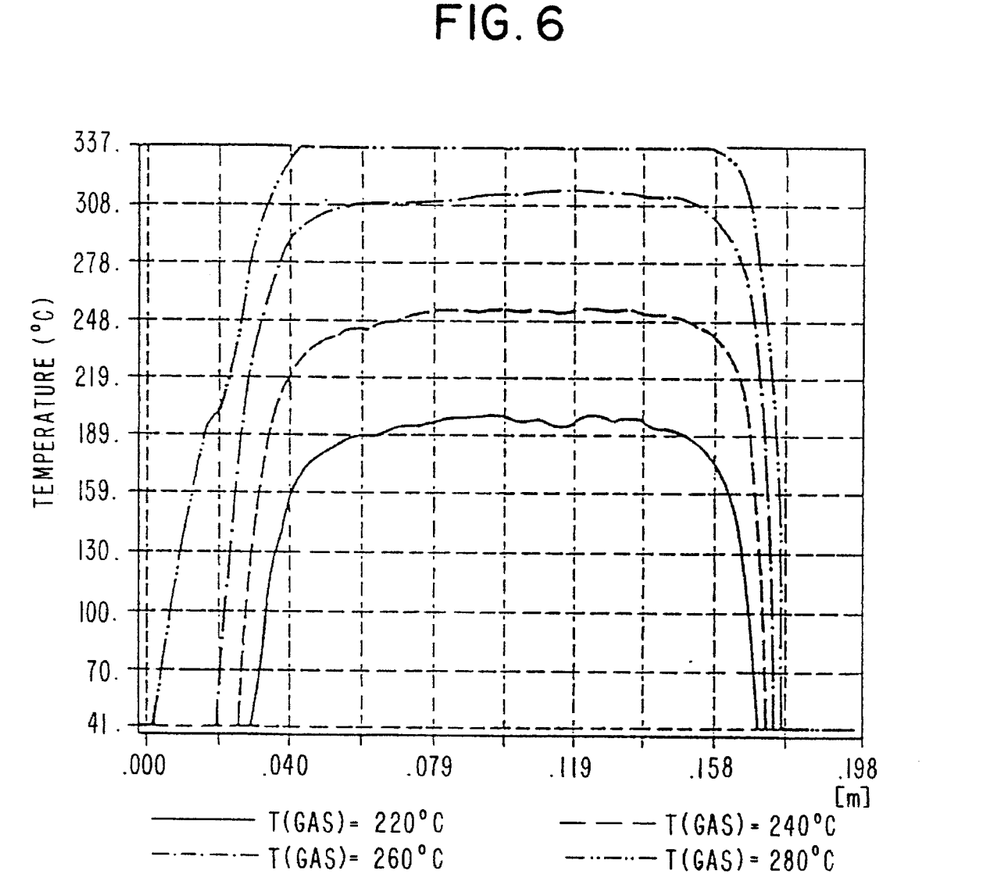
FIG. 6 shows the same distribution of temperature as in FIG. 5 for the catalysts according to the invention of Example 3b.
Figure 7:
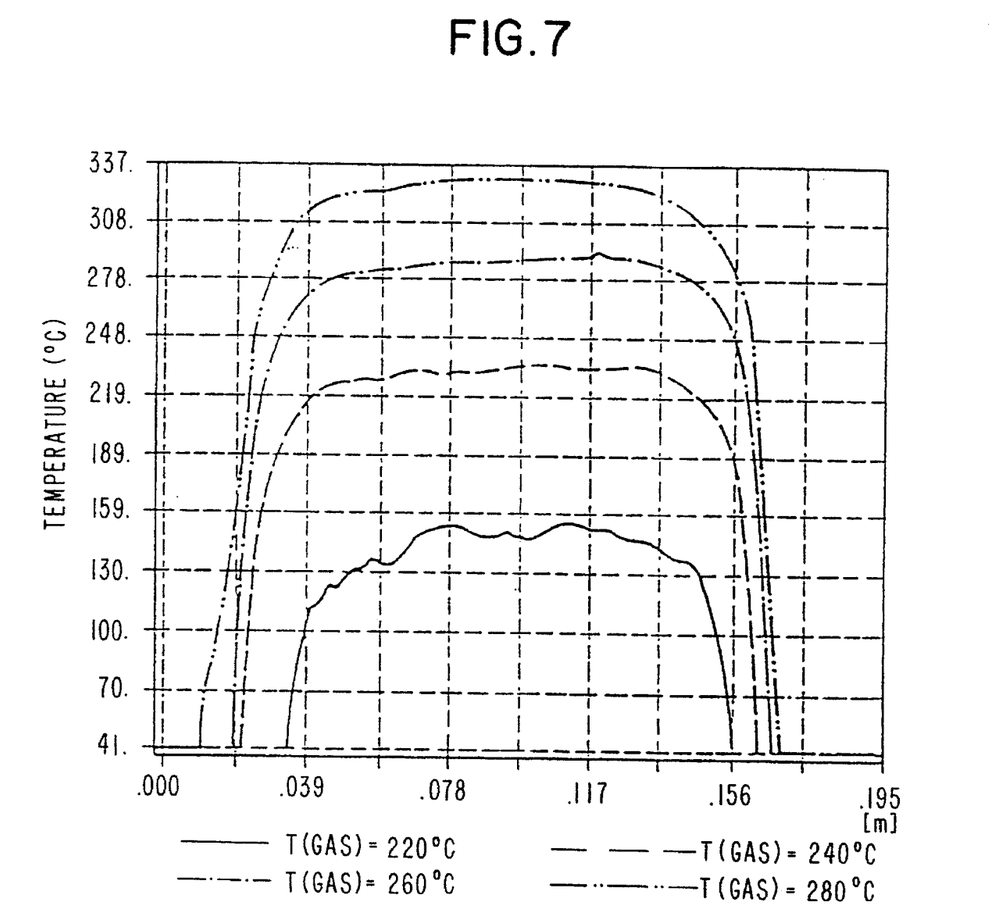
FIG. 7 shows the same distribution of temperature as in FIG. 5 for the known catalysts of Comparison Example 3.

Evaluation of the photographs produced the temperature distributions shown in FIG. 5 for the catalysts of Example 3a, in FIG. 6 for the catalysts of Example 3b and in FIG. 7 for the known catalysts of Comparison Example 3. Table 4 shows the temperatures, determined from these temperature distributions, on the outlet surface of the catalysts for the middle and for 25, 50 and 75% of the radius of the catalysts.

TABLE 4

Temperature distribution over the outlet cross-section of catalysts K3a, K3b and VK3

| Catalyst | Entry temperature [°C.] | Radial temperature distribution | | | |
|---|---|---|---|---|---|
| | | Middle [°C.] | 25% R [°C.] | 50% R [°C.] | 75% R [°C.] |
| K3a | 220 | 190 | 175 | 168 | 70 |
| | 240 | 250 | 246 | 232 | 160 |
| | 260 | 310 | 308 | 300 | 250 |
| | 280 | 350 | 350 | 337 | 270 |
| K3b | 220 | 195 | 190 | 175 | 70 |
| | 240 | 253 | 250 | 236 | 160 |
| | 260 | 310 | 310 | 308 | 250 |
| | 280 | 350 | 350 | 337 | 270 |
| VK3 | 220 | 145 | 140 | 130 | 40 |
| | 240 | 225 | 225 | 220 | 160 |
| | 260 | 280 | 280 | 278 | 220 |
| | 280 | 325 | 325 | 320 | 280 |

These results impressively show that the ceramic element heats up more homogeneously and more quickly with an increasing amount of the coarse component in the washcoat. This effect is distinctly enhanced by the exothermic nature of the pollutant conversion process.

Example 4

This Example relates to US-FTP 75 test using the catalysts of Example 3b (K3b) and Comparison Example 3 (VK3).

These catalysts were subjected to the US-FTP 75 exhaust gas test in a vehicle (2.5 liters, 6 cylinders, Motronic). To this end, the vehicle was arranged on an exhaust roller test bench.

The catalysts were tested in the fresh state and after aging for 60 hours in the engine. The measurement results are set out in Table 5. They show the pollutant emissions during the particularly critical cold-start phase in which the heating kinetics of the catalysts crucially influence pollutant conversion.

The results of the US-FTP 75 test show that the conversion of carbon monoxide and hydrocarbons in the critical cold-start phase is better with the catalysts of Example 3b (K3b) than with the known catalysts of Comparison Example 3 (VK3).

TABLE 5

Pollutant emission in the cold-start phase of the US-FTP 75 exhaust gas test for fresh and engine-aged catalysts

| Catalyst | CO [g/mile] | HC [g/mile] | NOx [g/mile] |
|---|---|---|---|
| K3b Fresh | 5.29 | 0.75 | 0.52 |
| VK3 Fresh | 8.85 | 0.75 | 0.50 |
| K3b Aged | 9.60 | 0.87 | 1.08 |
| VK3 Aged | 10.82 | 1.02 | 0.98 |

While the invention has been described in conjunction with various specific embodiments and examples, those skilled in this art will recognize that various changes and modifications may be made without departing from the spirit and scope of the invention defined in the appended claims.

The priority document, German Patent Appl. No. 42 04 421.9, filed in Germany on Feb. 14, 1992, is relied on and entirely incorporated herein by reference.

We claim:

1. A coating dispersion for catalysis-promoting coatings on an inert, structure-reinforcing element, comprising: an aqueous dispersion of at least one temperature-resistant support material and at least one active component, wherein the active component optionally includes at least one promoter, wherein at least one member selected from the group consisting of the temperature-resistant support material, the active component or the promoter has a multimodal particle size distribution including a fine-particle solids fraction and a coarse-particle solids fraction, wherein the coarsest particle solids fraction has an average particle diameter in the range of 20 to 100 μm.

2. A coating dispersion as claimed in claim 1, wherein all of the temperature-resistant support materials, the active components, and the promoters have a bimodal particle size distribution, having a fine-particle solids fraction and a coarse-particle solids fraction.

3. A coating dispersion as claimed in claim 1, wherein at least one member selected from the group consisting of the temperature-resistant support material, the active component, and the promoter has a bimodal particle size distribution, and at least one member selected from the group consisting of the temperature-resistant support material, the active component, and the promoter is present in only one of the fine-particle solids fraction or the coarse-particle solids fraction.

4. A coating dispersion as claimed in claim 2, wherein the fine-particle solids fraction has a particle size between 1 and 10 μm and is present in a ratio by weight of 20:1 to 1:2 to the coarse-particle solids fraction.

5. A coating dispersion as claimed in claim 3, wherein the fine-particle solids fraction has a particle size between 1 and 10 μm and is present in a ratio by weight of 20:1 to 1:2 to the coarse-particle solids fraction.

6. A coating dispersion as claimed in claim 2, wherein the fine-particle solids fraction has a particle size between 1 and 10 μm and is present in a ratio by weight of 12:1 to 2:1 to the coarse-particle solids fraction.

7. A coating dispersion as claimed in claim 3, wherein the fine-particle solids fraction has a particle size between 1 and 10 μm and is present in a ratio by weight of 12:1 to 2:1 to the coarse-particle solids fraction.

8. A coating dispersion as claimed in claim 1, wherein the fine-particle solids fraction has a particle size between 1 and 10 μm and is present in a ratio by weight of 20:1 to 1:2 to the coarse-particle solids fraction, and wherein at least one promoter is present as a solid, the promoter being present only in the fine-particle solids fraction.

9. A coating dispersion as claimed in claim 8, wherein the temperature-resistant support material is at least one member selected from the group consisting of: aluminum oxide, titanium oxide, silicon oxide, tin oxide, zirconium oxide, magnesium oxide, rare earth oxides, aluminum silicate, zeolite, and alkaline earth metal titanate, wherein the temperature-resistant support material is optionally stabilized.

10. A coating dispersion as claimed in claim 9, wherein the promoter is at least one member selected from the group of: rare earth metals, alkaline earth metals, and compounds of the elements of the third to fifth main periodic groups.

11. A coating dispersion as claimed in claim 10, wherein the temperature-resistant support material includes an active, optionally stabilized, aluminum oxide having a specific surface of 50 to 350 $m^2/g$ and a total pore volume of 0.3 to 2 ml/g, wherein a ratio by weight of the fine-particle solids fraction to the coarse-particle solids fraction is 18:1 to 1:1.

12. A coating dispersion as claimed in claim 11, wherein, in addition to the aluminum oxide support material, the dispersion contains 3 to 70% by weight cerium oxide, 0 to 25% by weight zirconium oxide, 0 to 15% by weight nickel oxide, 0 to 10% by weight iron oxide, 0 to 10% by weight germanium oxide and 0 to 10% by weight barium oxide based on a dry weight of the dispersion.

13. A coating dispersion as claimed in claim 12, wherein the dispersion contains 0.01 to 10% by weight noble metals in elemental form or in the form of compounds, based on a dry weight of the dispersion, as active components, said noble metals including platinum and palladium, and at least one member selected from the group consisting of rhodium and iridium, wherein a ratio by weight of platinum to palladium is in the range of 1:10 to 10:1, and a ratio by weight of platinum and palladium to rhodium and/or iridium is in the range of 1:1 to 30:1.

14. A coating dispersion as claimed in claim 13, wherein essentially all of the noble metals are deposited on the coarse-particle solids fraction.

15. A process for producing a coating dispersion for an inert, structure-reinforcing element, wherein the coating dispersion is an aqueous dispersion of at least one temperature-resistant support material, and at least one dissolved compound as an active component, wherein the active component optionally includes at least one promoter, wherein at least one member selected from the group consisting of the temperature-resistant support material, the active component, and the promoter has a bimodal particle size distribution including a fine-particle solids fraction and a coarse-particle solids fraction, wherein the coarse-particle solids fraction has an average particle diameter in the range of 20 to 100 μm, the process comprising:

wet-grinding a portion of a solid corresponding to the coarse-particle solids fraction to obtain a particle size distribution corresponding to the fine-particle solids fraction; and homogeneously mixing at least a portion of the fine-particle solids fraction with a portion of the coarse-particle solids fraction.

16. A process for the production of a coating dispersion containing active aluminum oxide as a support material and at least one member selected from the group consisting of rare earth oxides, zirconium oxide, nickel oxide, iron oxide, germanium oxide and barium oxide, the process comprising: providing a quantity of active aluminum oxide wherein a particle size distribution of the aluminum oxide corresponds to a coarse-particle solids fraction of the coating dispersion, wet-grinding a part of the coarse-particle solids fraction of the aluminum oxide, before, during or after adding a desired quantity of rare earth oxides, zirconium oxide, nickel oxide, iron oxide, germanium oxide, or barium oxide, and water to produce a fine-particle solids fraction; and homogeneously mixing at least a portion of the fine-particle solids fraction with an unground portion of aluminum oxide.

17. A catalyst for treating exhaust gas of an internal combustion engine, comprising: an inert ceramic or metal element having a honeycomb structure; a coating on the inert ceramic or metal element, wherein the coating includes at least one temperature-resistant support material and active components in an amount of 0.01 to 10% by weight, the active components being platinum, palladium, and optionally rhodium or iridium, with a ratio by weight of platinum to palladium of 1:10 to 10:1, wherein the catalyst is obtained by coating the inert ceramic or metal element with a coating dispersion to form a coated ceramic or metal element, drying the element in air at 250° C., and treating the element at temperatures of 250° to 650° C., optionally in a hydrogen-containing gas stream, wherein the coating dispersion is an aqueous dispersion of the temperature-resistant support material and the active components, wherein the active components optionally include at least one promoter, wherein at least one of the members selected from the group consisting of the temperature-resistant support material, the active components, and the promoter has a multimodal particle size distribution including a fine-particle solids fraction and a coarse-particle solids fraction, wherein the coarsest particle solids fraction has an average particle diameter in the range of 20 to 100 μm, wherein the coating dispersion is applied to the inert ceramic or metal element in a quantity of 30 to 400 grams dry matter per liter catalyst volume.

18. The catalyst according to claim 17, wherein the coating dispersion is applied to a flat, corrugated and/or perforated metal foil as the element having a honeycomb structure.

19. The catalyst according to claim 17, wherein the coating dispersion is applied as an outer layer over a base layer of a catalytically neutral material and/or a catalytically active material.

20. The catalyst according to claim 17, wherein the coating produced from the multimodal coating dispersion is provided as a substrate, and an outer layer of an active material and/or a protective fine-particle material is provided over the substrate.

21. A catalyst for treating exhaust gas of an internal combustion engine, comprising: an inert ceramic or metal element having a honeycomb structure; a catalyst coating on the inert ceramic or metal element, wherein the catalyst coating includes at Least one temperature resistant support material and active components in an amount of 0.01 to 10% by weight, the active components being platinum, palladium, and optionally rhodium or iridium, with a ratio by weight of platinum to palladium of 1:10 to 10:1, wherein the catalyst is obtained by coating the inert ceramic or metal element with a coating dispersion including the temperature-resistant support material, to thereby provide a coated element, and impregnating the coated element, after drying in air at 250° C., with an aqueous solution of a salt or a mixture of salts of the active components to thereby provide an impregnated coating on the element, drying and treating the impregnated coating at temperatures of 250° to 650° C., optionally in a hydrogen-containing gas stream, to thereby provide the catalyst coating on the inert ceramic or metal element, wherein the active components optionally include at least one promoter, and wherein at least one member selected from the group consisting of the temperature-resistant support material, the active components, and the promoter has a multi-modal particle size distribution including a fine-particle solids fraction and a coarse-particle solids fraction, wherein the coarsest particle solids fraction has an average particle diameter in the range of 20 to 100 μm, wherein the coating is present on the inert ceramic or metal element in a quantity of 30 to 400 grams dry matter per liter catalyst volume.

22. The catalyst according to claim 21, wherein the coating dispersion is applied to a flat, corrugated and/or perforated metal foil as the inert ceramic or metal element having a honeycomb structure.

23. The catalyst according to claim 21, wherein the coating dispersion is applied as an outer layer over a base layer of a catalytically neutral material and/or a catalytically active material.

24. The catalyst according to claim 21, wherein the coating produced from the multimodal coating dispersion is provided as a substrate, and an outer layer of an active material and/or a protective fine-particle material is provided over the substrate.

25. A process according to claim 16, wherein cerium oxide is added to the aluminum oxide.

26. The catalyst according to claim 17, wherein rhodium or iridium is present as one active component such that a ratio by weight of platinum and/or palladium to rhodium or iridium is in the range of 1:1 to 30:1.

27. The catalyst according to claim 21, wherein rhodium or iridium is present as one active component such that a ratio by weight of platinum and/or palladium to rhodium or iridium is in the range of 1:1 to 30:1.

28. A coating dispersion for catalysis-promoting coatings on an inert, structure-reinforcing element, comprising: an aqueous dispersion of at least one temperature-resistant support material having a specific surface in the range of 50 to 350 m²/g, and at least one dissolved compound as an active component, wherein the active component optionally includes at least one promoter, wherein at least one member selected from the group consisting of the temperature-resistant support material, the active component, and the promoter has a particle size distribution including a fine-particle solids fraction, and at least one member selected from the group consisting of the temperature-resistant support material, the active component, and the promoter has a particle size distribution including a coarse-particle solids fraction, and wherein the coarsest particle solids fraction has an average particle diameter in the range of 20 to 100 μm.

29. A coating dispersion as claimed in claim 9, wherein the promoter includes a transition metal.

\* \* \* \* \*